(12) United States Patent
van Ruth

(10) Patent No.: US 9,309,870 B2
(45) Date of Patent: Apr. 12, 2016

(54) THERMAL ACTUATOR

(71) Applicant: Nivaru B.V., Nederweert (NL)

(72) Inventor: Nico van Ruth, Hawthorn East (AU)

(73) Assignee: Nivaru B.V., Nederweert (NL)

( * ) Notice: Subject to any disclaimer, the term of this patent is extended or adjusted under 35 U.S.C. 154(b) by 756 days.

(21) Appl. No.: 13/622,133

(22) Filed: Sep. 18, 2012

(65) Prior Publication Data

US 2013/0068973 A1  Mar. 21, 2013

(30) Foreign Application Priority Data

Sep. 21, 2011  (AU) ................. 2011903894

(51) Int. Cl.
| | |
|---|---|
| *F16K 31/16* | (2006.01) |
| *F03G 7/06* | (2006.01) |
| *F16K 31/00* | (2006.01) |
| *G05D 23/12* | (2006.01) |
| *F16T 1/20* | (2006.01) |

(52) U.S. Cl.
CPC ............... *F03G 7/06* (2013.01); *F16K 31/002* (2013.01); *F16K 31/16* (2013.01); *G05D 23/126* (2013.01); *F16T 1/20* (2013.01); *Y10T 137/85986* (2015.04)

(58) Field of Classification Search
CPC ......... F16K 31/002; F16K 31/16; F03G 7/06; G05D 23/126; F16T 1/20; F16T 1/22; F16T 1/32; F24D 19/1006; F24D 2220/048

USPC ........... 251/11; 137/578, 861, 872, 875, 468, 137/423, 434, 448, 412, 118.02, 122; 60/517, 520, 518, 530; 236/52, 55

See application file for complete search history.

(56) References Cited

U.S. PATENT DOCUMENTS

| | | | | | |
|---|---|---|---|---|---|
| 1,102,035 | A | * | 6/1914 | Fulton | 236/18 |
| 1,591,085 | A | * | 7/1926 | Fulton | 236/18 |
| 1,612,760 | A | * | 12/1926 | Eggleston | 236/18 |
| 1,847,911 | A | * | 3/1932 | Trane | 236/42 |
| 1,885,479 | A | * | 11/1932 | Reutter | 60/530 |
| 1,971,242 | A | * | 8/1934 | Wheeler | 126/596 |
| 3,009,678 | A | * | 11/1961 | Soderberg et al. | 251/85 |
| 4,326,499 | A | * | 4/1982 | Koskela | 126/588 |
| 4,413,615 | A | * | 11/1983 | Sigworth, Jr. | 126/584 |

\* cited by examiner

*Primary Examiner* — John K Fristoe, Jr.
*Assistant Examiner* — Andrew J Rost
(74) *Attorney, Agent, or Firm* — Alston & Bird LLP

(57) ABSTRACT

The present disclosure provides a thermal actuator which comprises at least two containers containing a first fluid. The at least two containers define interior portions that are interconnected such that the interior portions of the containers are in fluidal communication with each other. The first fluid comprises a first liquid component and a second gaseous component. The thermal actuator is arranged such that a change in a temperature difference between one container and the or another container and within a predetermined range of temperature difference causes a quantity of a fluid contained in the thermal actuator to be transferred from the one container to the or another container such that a mass distribution of the thermal actuator is altered in response to the change in temperature difference so as to cause actuation.

20 Claims, 9 Drawing Sheets

THERMAL ACTUATOR

CROSS-REFERENCE TO RELATED APPLICATIONS

This application claims priority from Australian Application No. 2011903894 entitled "A Thermal Actuator," which was filed on Sep. 21, 2011, the contents of which is hereby incorporated by reference herein in its entirety.

BACKGROUND

Thermal actuators are devices that convert thermal energy into mechanical energy. In some applications, the thermal energy is actively provided to the thermal actuator, for example by an electrical heating element, in which case the actuator is commonly referred to as an 'electrothermal' actuator. In this case, conversion of thermal energy into mechanical energy is a primary function of the thermal actuator.

In other applications, the thermal energy is provided by the surroundings of the actuator, sometimes referred to as a 'passive' system. In this case, the actuator acts as a temperature sensor as well as a means of converting thermal energy into mechanical energy. In some of these applications the actuator is commonly referred to as a 'thermostatic actuator'.

In many of these 'passive' applications, the actuating force is used to operate a valve, wherein the valve responds to a change in temperature of the surroundings of the actuator by closing, completely or partially, a flow through the valve, or, in the case of a three-way valve, by directing the flow in one direction or the other.

There are many known types of thermal actuators, however they have in common that the thermal energy is converted into mechanical energy by expansion of a material within the actuator. This expansion may be related to a phase transition of the material at a given temperature or within a given temperature range, or it may be related to thermal expansion of a material within a certain phase over a certain temperature range.

Although existing 'passive' thermal actuators can act as sensors by comparing the temperature of their surroundings to a preset temperature (or temperature range), they cannot actuate based on temperature differences between different sections of the same actuator. As such, there is a need for technological advancement.

BRIEF SUMMARY OF VARIOUS EMBODIMENTS

In accordance with a first aspect of the present invention, there is provided a thermal actuator comprising: at least two containers containing a first fluid, the at least two containers defining interior portions that are interconnected such that the interior portions of the containers are in fluidal communication with each other, the first fluid comprising a first liquid component and a second gaseous component; and wherein the thermal actuator is arranged such that a change in a temperature difference between one container and the or another container and within a predetermined range of temperature difference causes a quantity of a fluid contained in the thermal actuator to be transferred from the one container to the or another container such that a mass distribution of the thermal actuator is altered in response to the change in temperature difference so as to cause actuation.

The at least two containers typically are interconnected such that a closed system is formed.

Further, the second gaseous component may comprise a vapor of the first liquid component that is in, or close to, liquid-vapor equilibrium with the first liquid component at a liquid-vapor interface or interfaces.

In one embodiment, the fluid that is transferred between containers in response to the change in temperature difference is at least a portion of the first fluid.

In an alternative embodiment, the fluid that is transferred between containers in response to the change in temperature difference is at least a portion of a further fluid. In this embodiment, the first and further fluids are substantially separated from one another. In one example, the thermal actuator is arranged to allow the first and further fluids to be separated by a physical barrier, such as a flexible membrane. In another example, the first and further fluids are substantially separated by virtue of respective properties of the fluids. For example, the first and further fluids may be chosen such that they are substantially immiscible with one another. It will be appreciated that at least two of the containers may contain different first fluids.

In one embodiment, respective lower regions of the interior portions of the at least two containers are interconnected so as to promote a flow of a liquid component of the fluid therebetween.

In embodiments wherein respective lower regions of the interior portions of the at least two containers are interconnected, the at least two containers may be at a substantially similar level such that a force due to gravity has a negligible effect on relative levels of the liquid component within the at least two containers. Alternatively, a first of the at least two containers may be positioned at a higher level relative to a second of the at least two containers so as to create an initial condition wherein relative levels of the liquid component within the at least two containers is different. Altering the relative levels between the at least two containers allows the thermal actuator to be set to actuate within particular ranges of temperature difference. It will be appreciated that the temperature difference range in which actuation can take place is at least partially dependent upon the relative levels of the liquid component within the at least two containers and, consequently, a larger change in these relative levels during fluid transfer between the at least two containers will result in a larger temperature difference range in which actuation can take place.

In embodiments wherein the fluid that is transferred between containers in response to the change in temperature difference is at least a portion of a further fluid, a similar effect to the above can be achieved without requiring a difference between relative levels by selecting different first fluids for at least two of the containers, the different first fluids having different properties. For example, the different first fluids may have different relationships between temperature and vapor pressure.

It will be appreciated that the thermal actuator will work with virtually all fluids having a liquid component in, or close to, liquid-vapor equilibrium with a gaseous component, where the gaseous component comprises the vapor of the liquid component. Some liquid components may provide certain advantages, for example highly volatile liquids for quick transfer of the fluid, or liquids with a relatively high density for high mass transfer per volume unit, and liquids with an atmospheric boiling point around the application temperature, to avoid restrictively large pressure differences between the inside of the actuator and the ambient. The fluid may be a halogenated hydrocarbon of the type typically used as a refrigerant, such as a perfluorinated alkane. In one example, the fluid is perfluorohexane, having a relatively high density (~1.7 g/cm³), a relatively low heat of fusion (~88 kJ/kg) and a boiling point of ~56° C. at atmospheric pressure.

In accordance with a second aspect of the present invention, there is provided a thermal actuator comprising first and second portions, the thermal actuator being actuatable in response to a change in a temperature difference between the first and second portions in a manner such that an actuating force is provided by mass transfer between the first and second portions of the thermal actuator in response to the change in a temperature difference between the first and second portions.

In accordance with a third aspect of the present invention, there is provided a valve, the valve comprising the thermal actuator of any one of the preceding aspects of the present invention, the valve being arranged so as to be actuated by the thermal actuator.

In one embodiment, the valve comprises a valve housing to which the thermal actuator is coupled, the valve housing comprising an inlet port, an outlet port and a valve member for closing the outlet port, the valve being arranged such that a first container of at least two containers of the thermal actuator is associated with a temperature of an inlet fluid and a second of the at least two containers is associated with a temperature of fluid in a vessel into which fluid from the outlet port can flow; and wherein the valve is arranged such that the thermal actuator causes the outlet port to be closed or opened by the valve member based on a temperature difference between the first and second containers.

It will be appreciated that the inlet fluid is a fluid that either flows into the inlet or that has flowed through the inlet but has not yet flowed through the outlet port or any further outlets of the valve.

In one embodiment, the first container is the valve member. Alternatively, the thermal actuator may actuate the valve member.

In one embodiment, the thermal actuator is coupled to the valve member for actuation thereof via a lever arm member, the lever arm member having a length so as to provide a mechanical advantage when actuating the valve.

Alternatively, a conduit between the first and second containers may be relatively inflexible and have a length such that the conduit can function as a lever arm so as to provide a mechanical advantage when actuating the valve.

The valve housing may comprise a bypass port. The bypass port may be configured so as to allow increased fluid flow therethrough when the outlet port is closed compared to when the outlet port is open. In another embodiment, the valve member may be arranged to close the outlet port or the bypass port based on a temperature difference between the first and second containers. In a still further embodiment, the valve may comprise a bypass port valve member for closing the bypass port, the bypass port valve member being configured to close the bypass port when the outlet port is open, and to open the bypass port when the outlet port is closed.

The valve may be arranged to close the outlet port when the temperature difference between the temperature associated with the inlet fluid and the temperature associated with the fluid in the vessel is lower than the range of temperature difference within which actuation takes place. Alternatively, the valve may be arranged to close the outlet port when the temperature difference between the temperature associated with the inlet fluid and the temperature associated with the fluid in the vessel is higher than the range of temperature difference within which actuation takes place.

The first and second containers may be positioned at different heights relative to one another so as to change the range of temperature difference in which actuation takes place.

In one example, for an embodiment wherein the valve is arranged to close the outlet port when the temperature difference between the temperature associated with the inlet fluid and the temperature associated with the fluid in the vessel is lower than the range of temperature difference within which actuation takes place, the second container may be positioned at a higher level than the first container so that the temperature difference between the temperature associated with the inlet fluid and the temperature associated with the fluid in the vessel always needs be to positive for the valve to be in the open position.

In another example, for an embodiment wherein the valve is arranged to close the outlet port when the temperature difference between the temperature associated with the inlet fluid and the temperature associated with the fluid in the vessel is higher than the range of temperature difference within which actuation takes place, the second container may be positioned at a lower level than the first container so that the temperature difference between the temperature associated with the inlet fluid and the temperature associated with the fluid in the vessel always needs to be negative for the valve to be in the open position.

In one embodiment, a volume of the second container is greater than a volume of the first container. This provides the advantage of allowing a certain volume of the gaseous component and/or the liquid component to be present in the second container regardless of a temperature difference between the first and second containers since a maximum volume of the liquid component of the fluid that can be transferred between the first and second containers is equal to a volume of the smaller of the first and second containers. The variable extra volume of the gaseous component or the liquid component in the second container allows for variation of a maximum upward and downward force exerted by the second container by varying an amount of the liquid component in the thermal actuator.

It will be appreciated that a plurality of valves, for example a plurality of valves in accordance with the second, third or fourth aspects, may be arranged so as to be actuated by a single thermal actuator.

In accordance with a fourth aspect of the present invention, there is provided a heating system comprising: a container for containing a heating medium, the container comprising at least one inlet arranged to receive the heating medium, and at least one outlet; a heat transferor for transferring heat obtainable from an energy source to the heating medium, the heat transferrer having an inlet for receiving the heating medium, a heat transfer portion for transferring heat obtained from the energy source to the received heating medium, and an outlet for the heated heating medium to exit there-through; and a heating medium transfer network for transferring the heating medium between the container and the heat transferrer, the transfer network being arranged so as to allow the heating medium to be transferred from the outlet of the container to the inlet of the heat transferrer, and from the outlet of the heat transferrer to the at least one inlet of the container, the transfer network being connected to the at least one inlet of the container; and wherein the at least one inlet of the container comprises a valve in accordance with the fourth aspect of the present invention, the valve being arranged so as to allow the heating medium to enter the container if a temperature difference between heating medium in the transfer network in the vicinity of the valve and heating medium in the container in the vicinity of the valve is greater than a predetermined threshold.

In one embodiment, the container comprises a plurality of inlets arranged at different heights of the container and arranged to receive the heating medium, the heating medium transfer network being connected to the inlets of the container in series from an uppermost inlet to a lowermost inlet; and wherein at least an uppermost inlet of the container comprises a valve in accordance with the fourth aspect of the present invention, the valve being arranged so as to allow the heating medium to enter the container if a temperature difference between heating medium in the transfer network in the vicinity of the valve and heating medium in the container in the vicinity of the valve is greater than a predetermined threshold.

In one embodiment, a next lower inlet to the uppermost inlet comprises a further valve in accordance with the fourth aspect of the present invention, the further valve being arranged so as to allow the heating medium to enter the container if a temperature difference between heating medium in the transfer network in the vicinity of the further valve and the heating medium in the container in the vicinity of the further valve is greater than the predetermined threshold.

The at least one inlet or each of the plurality of inlets arranged to receive the heating medium may comprise a valve in accordance with the fourth aspect of the present invention, wherein the heating system is arranged such that heating medium that does not enter the container is directed to the heat transferrer.

The heat transferrer may be arranged to obtain heat from a solar energy source. In one example, the heating system is a solar thermal heating system.

The container may comprise a further outlet arranged so as to allow the heating medium to exit the heating system for use as a heating medium in a further system, such as a hot water system, the container also comprising: at least one return flow inlet for receiving a return flow of the heating medium from the further system, the at least one return flow inlet comprising a valve in accordance with the fourth aspect of the present invention, the valve being arranged to allow the heating medium to enter the container if a temperature of the heating medium of the return flow is lower than a temperature of the heating medium within the container.

In one embodiment, the container comprises a plurality of return flow inlets being vertically arranged wherein at least a lower inlet of the plurality of return flow inlets comprises a valve in accordance with the fourth aspect of the present invention, the valve being arranged to allow the heating medium to enter the container if a temperature of the heating medium of the return flow is lower than a temperature of the heating medium within the container and to otherwise divert the return flow to a next higher inlet of the plurality of return flow inlets.

In one embodiment, the at least one return flow inlet or each of the plurality of return flow inlets comprise a valve in accordance with the fourth aspect of the present invention, wherein the heating system is arranged such that heating medium of the return flow that is higher in temperature than heating medium within the container bypasses the container. This arrangement may provide an advantage for embodiments wherein the container is not provided with auxiliary heating, but wherein auxiliary heating is provided in a further container or by an inline heating device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

The present invention will now be described, by way of example only, with reference to the accompanying drawings, in which.

DETAILED DESCRIPTION OF VARIOUS EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
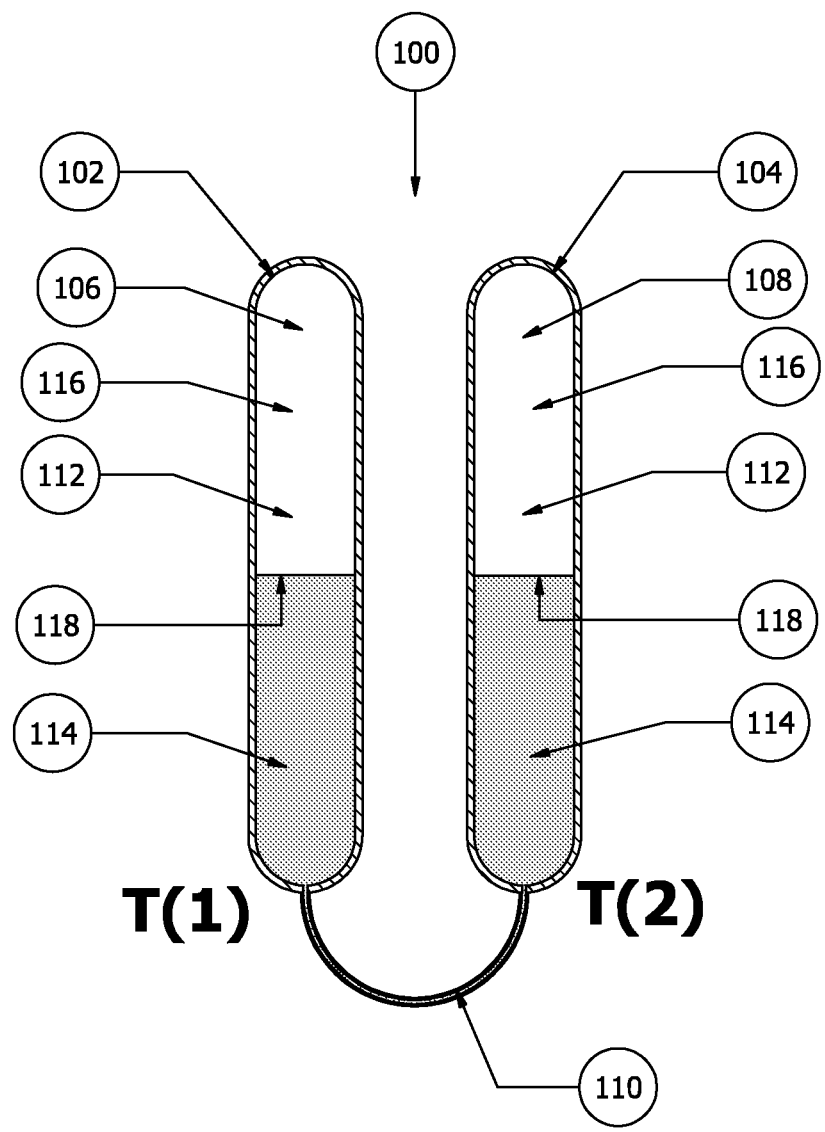
FIG. 1 is a schematic drawing of a thermal actuator in accordance with an embodiment of the present invention.

FIG. 1 shows a thermal actuator 100 comprising a first container 102 and a second container 104, each of the containers 102, 104 defining respective interior portions 106, 108. The interior portions 106, 108 are in fluid communication with one another via a conduit 110 such that a closed system is formed, and contain a fluid 112. The fluid 112 comprises a first liquid component 114 and a second gaseous component 116, where the gaseous component 116 comprises the vapor of the liquid component 114.

The thermal actuator 100 is arranged such that a change in a temperature difference between the first and second containers 102, 104 will cause a quantity of the fluid 112 to be transferred from one container 102, 104 to the other container 104, 102 such that a mass distribution of the thermal actuator 100 is altered in response to the temperature change. This alteration of the mass distribution can be used so as to cause actuation, for example actuation of a valve.

A transfer of the liquid component 114 between the containers 102, 104 to effect the alteration in the mass distribution, as opposed to a transfer of the gaseous component 116, would be advantageous as only a fraction of the liquid component 114 would be required to evaporate to push the liquid component 114 between the containers 102, 104. As such, respective lower regions of the interior portions 106, 108 of the first and second containers 102, 104 are interconnected so as to promote flow of the liquid component 114 therebetween. It will be appreciated, however, that other arrangements are possible and that transferring the gaseous component 116 will still work, however this type of transfer will be slower compared to transfer of the liquid component 114 as in this case all of the liquid component 114 that is to be transferred will need to evaporate.

In this example, the fluid 112 is transferred between the containers 102, 104 in response to the change in temperature difference between the containers 102, 104, however it will be appreciated that the fluid that is transferred between the two containers 102, 104 so as to effect the change in mass distribution of the thermal actuator 100 may be a further liquid. Further examples of these types of thermal actuators will be described in more detail later, however the basic operating principle of the thermal actuator 100 will now be described.

Typically, in use, each of the containers 102, 104 will be exposed to a different surrounding temperature. In this example, the first container 102 is exposed to a first surrounding temperature $T_1$ and the second container 104 is exposed to a second surrounding temperature $T_2$.

The liquid component 114 and/or the gaseous component 116 of the fluid 112 can be transferred between the first and second containers 102, 104 via the conduit 110. The thermal actuator 100 is arranged such that a liquid-vapor interface 118 between the liquid and gaseous components 114, 116 is formable in each container 102, 104.

Typically, the liquid component 114 is at, or close to, equilibrium with the gaseous component 116 at the liquid-vapor interface or interfaces 118. As discussed above, the thermal actuator 118 may also comprise a further liquid, which can form a liquid-liquid interface with the liquid component 114 of the fluid 112.

In a scenario wherein the container 102, 104 contains a liquid-vapor interface 118, pressure of the gaseous component 116 in the container 102, 104 is at, or close to, a vapor pressure of the liquid component 114 at the liquid-vapor interface 118, at the temperature $T_1$, $T_2$ at the liquid-vapor interface.

In a scenario wherein the container 102, 104 does not contain a liquid-vapor interface 118, for example if the container 102, 104 is completely filled with the liquid component 114 or completely filled with the gaseous component 116, a pressure in the container 102, 104 will be dictated by a pressure in the other container 104, 102 (or further container(s) for examples comprising more than two containers) that does (or do) contain a liquid-vapor interface 118, whilst also taking into account any pressure generated by gravitational forces due to differences in positional height between the liquid levels of the containers 102, 104.

In the case wherein the container 102, 104 is completely filled with the liquid component 114, if a temperature of the liquid component 114 exceeds a boiling temperature of the liquid component 114 at a given pressure, caused by the temperature in the container 102, 104 increasing or by the pressure decreasing as a result of a decrease in temperature in the other container 104, 102, at least a portion of the liquid component 114 will start to vaporize, and a liquid-vapor interface 118 will form in the container 102, 104.

In the case wherein the container 102, 104 is completely filled with the gaseous component 116, if a temperature of the gaseous component 116 falls below a condensation temperature at a given pressure, caused by the temperature in the container 102, 104 decreasing or by the pressure increasing as a result of an increase in temperature in the other container 104, 102, at least a portion of the gaseous component 116 will condensate, and a liquid-vapor interface 118 will form in the container 102, 104.

In containers 102, 104 that contain a liquid-vapor interface 118, a change in temperature at the liquid-vapor interface 118 will lead to either vaporization of the liquid component 114 (in the case of increasing temperature) or condensation of the gaseous component 116 (in the case of decreasing temperature) to accommodate for the change in equilibrium vapor pressure associated with the temperature change.

In the case wherein multiple containers 102, 104 contain a liquid-vapor interface 118, if the temperature changes in one of the containers 102, 104, for example if the temperature $T_1$, $T_2$ surrounding the container 102, 104 increases in temperature relative to the other container 104, 102 (or relative to further containers), then vaporization in one of the containers 102, 104, will be accompanied by condensation in the other container 104, 102 to accommodate for the change in vapor pressure in the container 102, 104.

It will be appreciated that the thermal actuator 100 will work with virtually all liquids. Some liquids may provide certain advantages, for example highly volatile liquids for quick transfer of the liquid component, or liquids with a relatively high density for high mass transfer per volume unit, and liquids with an atmospheric boiling point around the application temperature, to avoid restrictively large pressure differences between the inside of the actuator and the ambient. Halogenated hydrocarbons of the types commonly used as refrigerants are very suitable, particularly perfluorinated alkanes. In one example, the liquid may be a perfluorinated liquid such as perfluorohexane, having a high density ($\sim$1.7 g/cm$^3$), a low heat of fusion ($\sim$88 kJ/kg) and a boiling point of $\sim$56° C. at atmospheric pressure.

Referring to FIGS. 2a to 2i, transfer of fluid between containers 102, 104 in different scenarios will now be described.

Figure 2A:
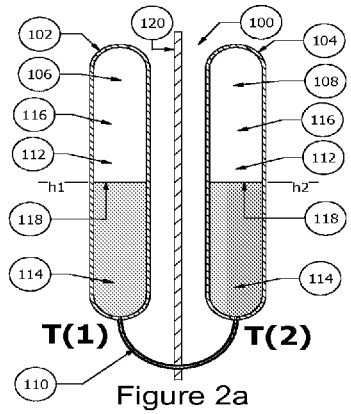
FIGS. 2a to 2i are schematic drawings of thermal actuators of embodiments of the present invention in different scenarios.

Referring initially to FIG. 2a, the first container 102 is in contact with its surroundings, for example a first liquid at temperature $T_1$, and the second container 104 is in contact with its surroundings, for example a second liquid, at temperature $T_2$. The surroundings, i.e., the first and second liquids, are sufficiently physically separated, as indicated by a wall 120, to allow a temperature difference to be present. The first and second containers 102, 104 are connected via the conduit 110 to form a closed system. A portion of the thermal actuator 100 is filled with the liquid component 114 of the fluid 112, and a remaining portion of the thermal actuator 100 is filled with the gaseous component 116 of the fluid 112, thus forming the liquid-vapor interfaces 118 between the liquid and gaseous components 114, 116.

The fluid 112 can be a pure substance, in which case the relationship between a vapor pressure p of the liquid component 114 and a temperature T at the liquid-vapor interface 118 can be described by the Antoine equation:

$$\log_{10} p = A - B/(C+T) \qquad \text{(Equation 1)}$$

wherein:
p is the vapor pressure (bar) of the liquid component 114;
T is the temperature (K) at liquid-vapor interface 118; and
A, B, C are constants specific for the liquid 114.

Alternatively, the fluid 112 can be a mixture of substances, in which case the relationship between the vapor pressure p and the temperature T is more complex and is specific for each mixture of substances.

In the case wherein the first and second containers 102, 104 are partially filled, the relationship between the vapor pressures and levels of the liquid components 114 of each container 102, 104 can be described by the following equation:

$$p_1(T_1)-p_2(T_2)=-\rho^*g^*(h_1-h_2) \quad \text{(Equation 2)}$$

wherein:

p(T) is the vapor pressure (bar) of the liquid component 114 in its respective container 102, 104 at its respective temperature $T_1, T_2$.

$\rho$ is a density (kg/m$_3$) of the liquid component 114;

g is gravitational acceleration (9.81 m/s$^2$); and h is a level (m) of the liquid component 114 in its respective container 102, 104.

If the second container 104 is completely filled with the liquid component 114, or the first container 102 is completely filled with the gaseous component 116, the difference between the levels of the liquid component 114 in each container 102, 104 will be at its minimum value $(h_1-h_2)_{min}$, and the relationship can be described by the following equation:

$$p_1(T_1)-p_2(T_2) \geq -\rho^*g^*(h_1-h_2)_{min} \quad \text{(Equation 3)}$$

If the first container 102 is completely filled with the liquid component 114, or the second container 104 is completely filled with the gaseous component 116, the difference between the levels of the liquid component 114 in each container 102, 104 will be at its maximum value $(h_1-h_2)_{max}$, and the relationship can be described by the following equation:

$$p_1(T_1)-p_2(T_2) \leq -\rho^*g^*(h_1-h_2)_{max} \quad \text{(Equation 4)}$$

FIGS. 2a to 2d illustrate the thermal actuator 100 when the first and second containers 102, 104 are positioned at the same level, and a volume of the liquid component 114 is more than half of a total volume of an internal region of the thermal actuator 100.

FIG. 2a illustrates an example wherein $T_1$ is equal to $T_2$, and the liquid levels $h_1$ and $h_2$ are equal. In this example, Equation 2 applies.

Figure 2B:
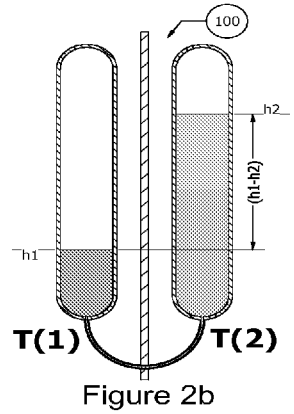

FIG. 2b illustrates an example wherein $T_1$ is slightly higher than $T_2$, but wherein the difference between $T_1$ and $T_2$ is not sufficiently high so as to cause the second container 104 to be completely filled with the liquid component 114. In this example, Equation 2 applies.

Figure 2C:
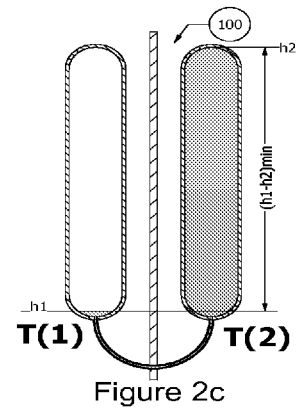

FIG. 2c illustrates an example wherein $T_1$ is significantly higher than $T_2$, enough so as cause the second container 104 to be completely filled with the liquid component 114. In this example, Equation 3 applies.

Figure 2D:
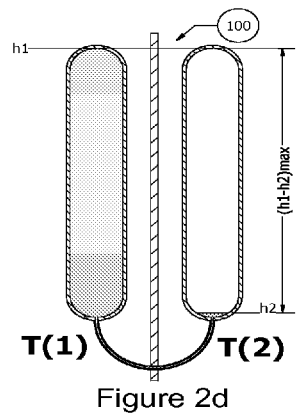

FIG. 2d illustrates an example wherein $T_2$ is significantly higher than $T_1$, enough so as to cause the first container 102 to be completely filled with the liquid component 114. In this example Equation 4 applies.

Figure 2E:
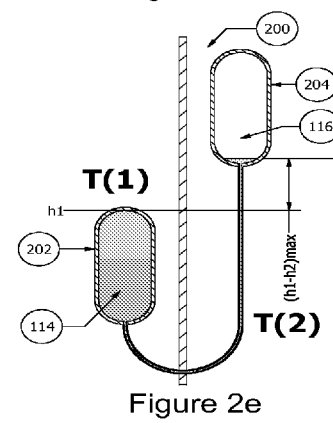
Figure 2F:
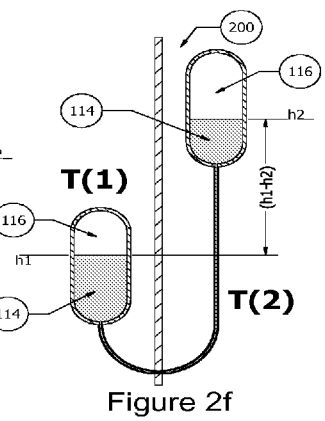
Figure 2G:
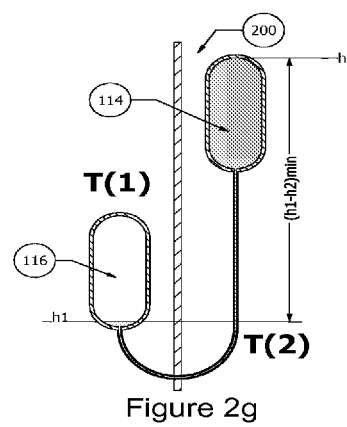

FIGS. 2e to 2g illustrate a thermal actuator 200 wherein a second container 204 is positioned at a higher level than a first container 202, and wherein a volume of the liquid component 114 is more than half of a total volume of an internal region of the thermal actuator 200.

FIG. 2e illustrates an example wherein $T_1$ is equal to $T_2$, in which case the first container 202 is filled completely with the liquid component 114 as the first container 202 is positioned completely below the second container 204. In this example Equation 4 applies.

FIG. 2f illustrates an example wherein $T_1$ is slightly higher than $T_2$, enough so as to cause a portion of the liquid component 114 to move from the first container 202 to the second container 204, but not enough to fill the second container 204 completely with the liquid component 114. In this example Equation 2 applies.

FIG. 2g illustrates an example wherein $T_1$ is significantly higher than $T_2$, enough so as to cause the second container 204 to be completely filled with the liquid component 114. In this example Equation 3 applies.

Figure 2H:
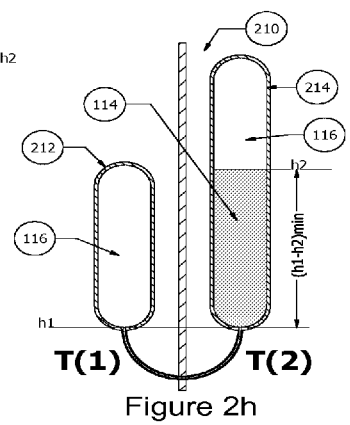
Figure 2I:
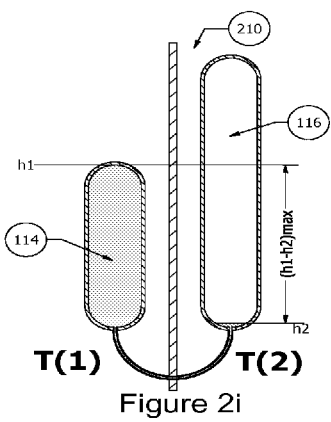

FIGS. 2h and 2i illustrate a thermal actuator 210 wherein the first and second container 212, 214 are positioned at the same level and wherein a volume of the second container 214 is larger than a volume of the first container 212 and an amount of the liquid component 114 contained in an internal region of the thermal actuator 210 is not sufficient to completely fill the second container 214.

FIG. 2h illustrates an example wherein $T_1$ is significantly higher than $T_2$ to such an extent so as to cause the first container 212 to be completely filled with the gaseous component 116. In this example Equation 3 applies.

FIG. 2i illustrates an example wherein $T_2$ is significantly higher than $T_1$ to such an extent so as to cause the first container 212 to be completely filled with the liquid component 114. In this example Equation 4 applies.

In the above examples, the liquid component 114 that is transferred between the first and second containers 102, 104 in response to a change in a temperature difference between the first and second containers 102, 104 so as to effect a change in a mass distribution of the thermal actuator 100, 200, 210 is a component of the fluid 112 that forms the liquid-vapor interface 118. It will be appreciated, however, that a liquid that is transferred between the first and second containers 102, 104 may be a further fluid than the fluid 112 that forms the liquid-vapor interface 118. Examples of such embodiments will now be described with reference to FIGS. 3a to 3c.

Figure 3A:
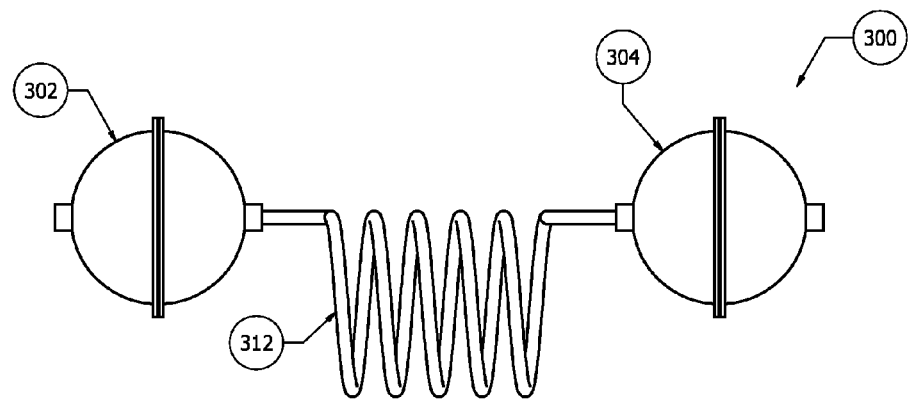
FIG. 3a is a front view.
Figure 3B:
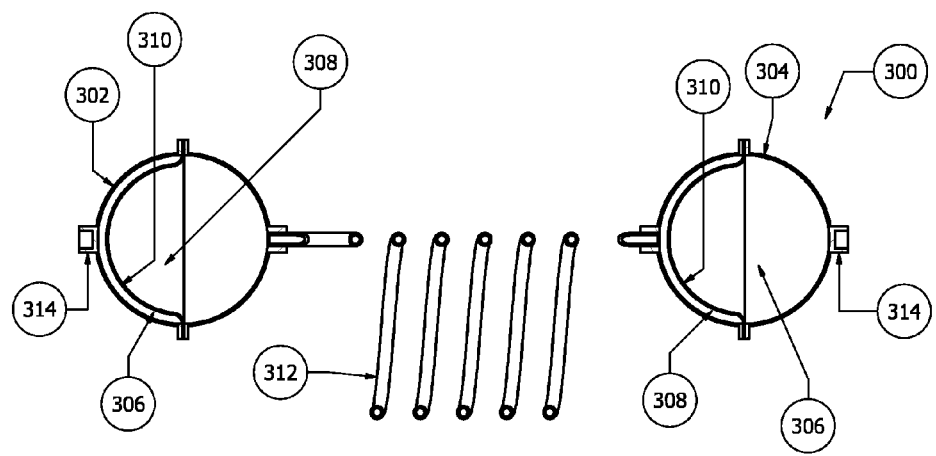
FIGS. 3b and 3c are cross-sectional drawings, of an alternative thermal actuator in accordance with an embodiment of the present invention.
Figure 3C:
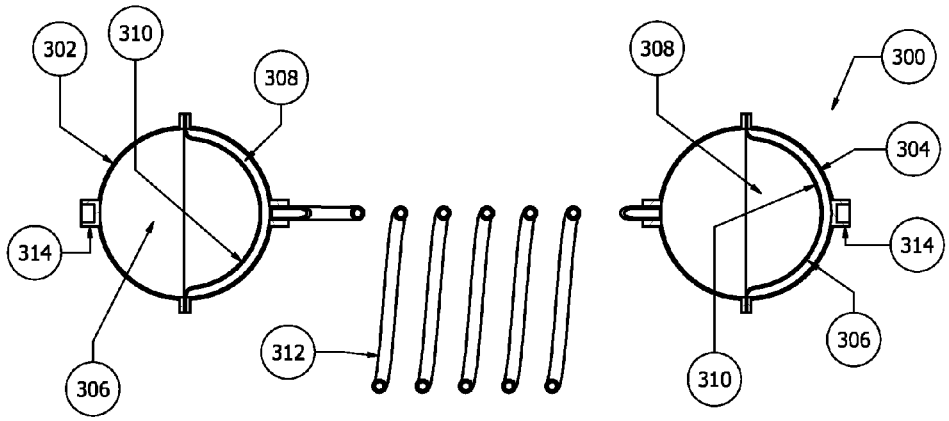

FIGS. 3a to 3c illustrate a thermal actuator 300, such as one that could be used in a valve based on components of a typical float valve or similar. The thermal actuator 300 comprises a first container 302 and a second container 304. The first container 302 defines a first internal portion 306 and a second internal portion 308, the first and second internal portions being separated by a flexible membrane 310. Similarly, the second container 304 defines a first internal portion 306 and a second internal portion 308 being separated by a flexible membrane 310. The second internal portions 308 of the first and second containers 302, 304 are in fluid communication with one another via a conduit 312. The first and second containers 302, 304 comprise respective connector portions 314 for connection to an element that is to be actuated, such as to a lever arm of a typical float valve.

As such, the thermal actuator 300 allows a first fluid to be contained in the first internal portions 306 of the first and second containers 302, 304 to provide the possibility of a liquid-vapor interface to be present within each of the first internal portions 306, the liquid-vapor interface being present in one or both of the internal portions 306, and a second fluid, typically a liquid, to be contained in the second internal portions 308 of the first and second containers 302, 304 and which can be transferred therebetween to provide a mass-transfer fluid. The mass-transfer fluid is used to alter the center of mass of the thermal actuator 300 in response to a change in a temperature difference between the first and second containers 302, 304 and therefore allow the thermal actuator 300 to function as an actuator.

FIG. 3b is a cross-sectional view of the thermal actuator 300 for an embodiment wherein the mass-transfer fluid, i.e., the second fluid, is mainly present in the first container 302.

FIG. 3c is a cross-sectional view of the thermal actuator 300 wherein with the mass-transfer fluid, i.e., the second fluid, is mainly present in the second container 304.

The first internal portions 306 contain the liquid component 114 and/or the gaseous component 116 of the fluid 112 for the liquid-vapor equilibrium, whereas the second internal portions 308 contain the second fluid used for the mass transfer.

The mass-transfer fluid moves between the second internal portions 308 depending on the change in temperature difference between the first and second containers 302, 304 and the difference in placement level, as described with reference to FIGS. 2a to 2i, with the density in Equations 2, 3 and 4 being the density of the mass transfer fluid, i.e., the second fluid.

One advantage of using a separate mass transfer fluid is that different fluids can be used for the liquid-vapor equilibrium in each of the first internal portions 306 of the first and second containers 302, 304 so as to create offsets in the temperature difference point at which the mass transfer occurs by means other than the placement level of the containers 302, 304.

Another advantage is that the mass-transfer fluid can be selected so as to have properties that make it more convenient to handle, such as low volatility and non-toxicity (e.g. water), which allows connections between the containers 302, 304 and the conduit 312 to be made in the field.

This could allow a thermal actuator to be formed in a modular way with any number of containers, which can be connected to a valve or can act solely as a temperature sensor, being connected using a network of tubing (e.g., via conduits 312). The second internal portions 308 of the containers can be initially filled to the maximum level with the mass-transfer fluid, with the first portions 306 of the containers containing the fluid for the liquid-vapor equilibrium completely in liquid state. The second internal portions 308 can then be connected to each other, and then a required volume of mass-transfer fluid can be bled from the thermal actuator 300 by heating one or more of the containers to the boiling point (at atmospheric pressure) of the fluid used for the liquid-vapor equilibrium, leaving only a volume of mass-transfer fluid required to enable one of the containers to effect actuation, such as actuation of a valve. It will be appreciated that a volume of mass-transfer fluid required to enable more than one of the containers to effect actuation may be left in the thermal actuator. Once the required amount of mass-transfer fluid is bled from the thermal actuator, which can be done through one of the connectors, or using a dedicated outlet from the tubing network, the tubing network is closed.

The use of a separate mass-transfer fluid can also be achieved without using a separator, such as the flexible membrane 310, to separate the mass-transfer fluid and the fluid used for the liquid-vapor equilibrium by using a two-phase liquid system in the thermal actuator, for example the thermal actuator 100 of FIG. 1, wherein the mass-transfer fluid has a higher density than the fluid used for the liquid-vapor equilibrium (so the liquid used for the liquid-vapor sits on top of the mass-transfer liquid) and wherein mass transfer fluid and the fluid used for the liquid-vapor equilibrium are substantially immiscible.

This provides the advantage of allowing different fluids for the liquid-vapor equilibrium to be used in the different containers, as described above.

Figure 4A:
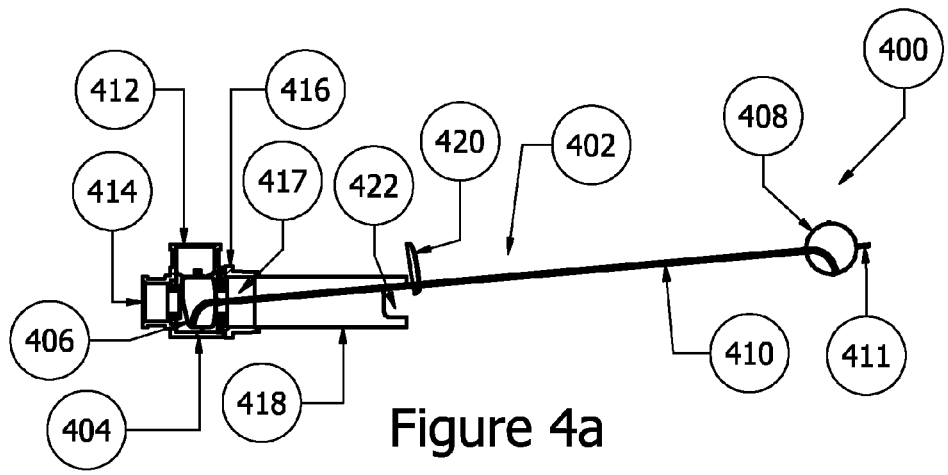
FIGS. 4a to 4c are cross-sectional drawings of a three-way valve incorporating a thermal actuator of an embodiment of the present invention.
Figure 4B:
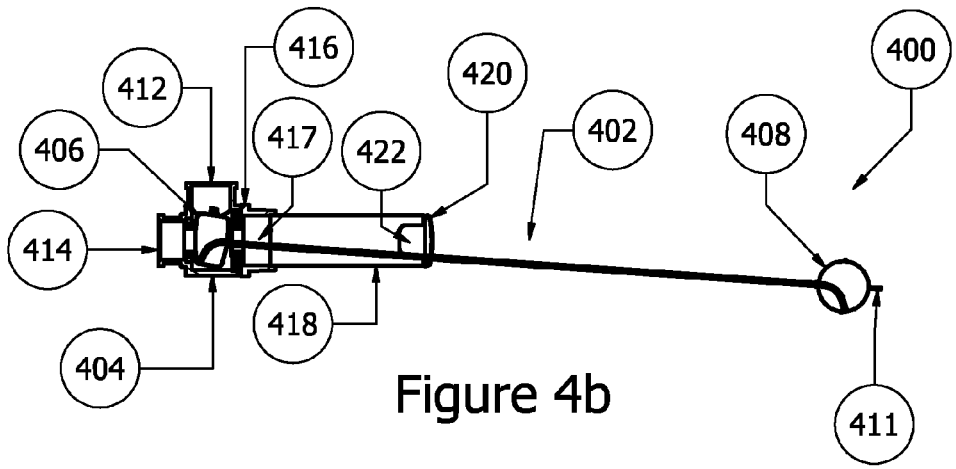
Figure 4C:
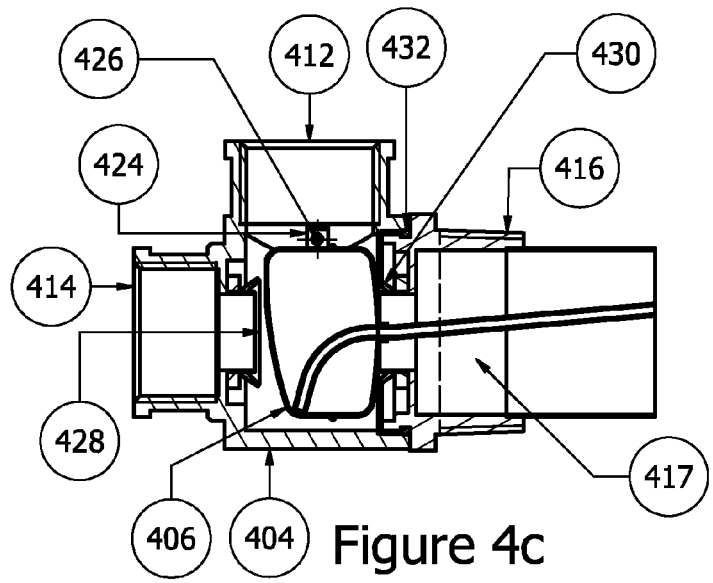

The thermal actuators of embodiments of the present invention may be used in valves. An example of one such valve 400 is shown in FIGS. 4a to 4c. The three-way valve 400 comprises a thermal actuator 402 coupled to a valve housing 404. The thermal actuator 402 comprises a first container 406 and a second container 408 in fluidal communication with one another via a conduit 410. The conduit 410 is relatively inflexible and, as shown in FIGS. 4a and 4b, provides a sufficient length between the second container 408 and its coupling to the valve housing 404 such that the conduit 410 can function as a lever arm so as to provide a mechanical advantage when actuating the valve 400.

The second container 408 comprises a filling tube 411 that can be used to fill the thermal actuator 402 with fluid and that is arranged to be closable after filling. The valve housing 404 comprises an inlet port 412 for receiving fluid flow, a bypass outlet port 414 for bypassing fluid flow therethrough, and is connected to an outlet port section 416 for connecting to a tank or similar, which comprises a tank outlet port 417. In this example, the tank outlet port 417 is connected to a tank (not shown) in which the second container 408 is arranged. In this example, a sleeve 418 is attached to the outlet port section 416, which directs the flow coming out of inlet outlet port 417 onto disc 420, where disc 420 interferes with the flow into a tank, and directs it sideways through opening 422 in sleeve 418, so as to minimize flow disturbance into a tank and to divert the flow from the direction of the second container 408, thereby reducing the impact of the temperature of the flow into the tank on the temperature of the second container 408.

FIG. 4a shows the valve 400 in a 'bypass' configuration, wherein flow of a fluid which is directed into the valve housing 404 via the inlet port 412 is directed to the bypass outlet port 414.

FIG. 4b shows the valve 400 in an 'open' configuration, wherein flow of a fluid directed into the valve housing 404 via the inlet port 412 is directed to the tank outlet port 417 that is in fluidal communication with the tank in which the second container 408 is arranged.

The valve housing 404 and its interaction with the thermal actuator 402 will now be described in more detail with reference to FIG. 4c.

Inside the valve housing 404, the first container 406 functions as a valve member and a temperature sensor. The first container 406 is attached to a bracket 424, which is connected to pivot pin 426, where pivot pin 426 is attached to valve housing 404. The bracket 424 pivots about the pivot pin 426, which allows the first container 406 to move between a valve seat 428 on the bypass port 414 side, and a valve seat 430 on the tank outlet port 417 side. The valve seat 430 is supported by outlet port section 416, and the connection between valve housing 404 and outlet port section 416 is sealed by O-ring 432.

The thermal actuator 402 is filled with a fluid such as the fluid 112 such that the thermal actuator is partly filled with the liquid component 114 and partly with the gaseous component 116. In this example, a volume of the second container 408, which functions as a float body and a temperature sensor within the tank, is greater than a volume of the first container 406, which functions as a valve member and a temperature sensor. This allows for a certain volume of the gaseous component 116 and/or the liquid component 114 to be present in the second container 408 regardless of a temperature difference between the first and second containers 406, 408 since a maximum volume of the liquid component 114 of the fluid 112 that can be transferred between the first and second containers 406, 408 is equal to a volume of the smaller of the first and second containers 406, 408.

The variable extra volume of the gaseous component 116 or the liquid component 114 in the second container 408 allows for variation of a maximum upward and downward force exerted by the second container 408 by varying an amount of the liquid component 114 in the thermal actuator 402. The variation of a maximum upward and downward force can alternatively be achieved by means of a spring attached to the actuator 402, or by attaching buoyancy aids, such as lightweight material floaters, hollow floaters, foamed floaters etcetera, or sinking weights to the actuator.

In use, the fluid flowing through the inlet port 412 flows around the first container 406, which as a result will be at, or close to, a temperature of the fluid flow. The second container 408 is arranged inside the tank, and will be at, or close to, a temperature of fluid in the tank at a level in the tank at which the second container 408 is arranged.

The liquid component 114 inside the thermal actuator 402 will flow from the first container 406 to the second container 408, or vice versa, depending on the temperature difference and the level difference between the first and second containers 406, 408 as explained with reference to the thermal actuator 100 of FIG. 2. In particular, the valve 400 will move to the 'bypass' configuration, as illustrated in FIG. 4*a*, when the second container is experiencing positive buoyancy due to the relatively high amount of the gaseous component 116 in the second container 408. Equivalently, the valve 400 will move to the 'open' configuration, as illustrated in FIG. 4*b*, when the second container 408 is experiencing negative buoyancy due to a relatively high amount of the liquid component 114 in the second container 408.

The second container 408 can be positioned at a higher level than the first container 406 in both the 'open and 'bypass' configurations, so that a temperature of the first container 406 always needs to be higher than a temperature of the second container 408 for the valve 400 to be in the 'open' configuration. One of the advantages of this possible arrangement is that the valve 400 will always be in the 'bypass' configuration when there is no fluid flow coming into the inlet port 412, thereby preventing possible thermally driven reverse flow from the tank through the valve 400.

Alternatively, the second container 408 can be positioned at a lower level than the first container 406 in both the 'open and 'bypass' configurations, so that the valve 400 can also be in the open position when the fluid flow is slightly lower in temperature than the temperature in the tank at the position of the valve, possible reducing the average temperature difference between the fluid flow into the tank and the temperature in the tank at the position of the valve.

The range of temperature difference within which actuation occurs depends on the configuration of the valve, since the placement level of the second container 408 depends on the configuration of the valve. For example, if the valve is in the 'bypass' configuration when actuation starts, the temperature difference between container 406 and 408 required for actuation to take place is higher than when the valve is in the 'open' configuration, where the actuation finishes, and therefore the temperature difference required for actuation becomes smaller as the actuation takes place. This way, the difference in the range of temperature difference for actuation between the two configurations helps the actuator to move the valve quickly from one configuration to the other, and this also prevents the valve from unwanted rapid switching in response to relatively small changes in temperature difference.

A three-way valve 500, with an alternative valve action to three-way valve 400, will now be described with reference to FIGS. 5*a* to 5*c*. The valve 500 has the same components as the valve 400 of FIGS. 4*a* to 4*c* (except for sleeve 418 and disc 420, which are not present in valve 500), in addition to which it has a buoyancy aid floater 502 connected to the conduit. In valve 500 a pivot point 424 of the valve 500 is placed below a first container 406 that functions as a valve member and a temperature sensor so as to reverse a direction of movement of the first container 406 in response to movement of second container 408 that functions as a float body and a temperature sensor in a tank. As before, the conduit 410 is relatively inflexible and, as shown in FIGS. 5*a* and 5*b*, provides a sufficient length between the second container 408 and its coupling to the valve housing 404 such that the conduit 410 can function as a lever arm so as to provide a mechanical advantage when actuating the inverted action valve 500.

Figure 5A:
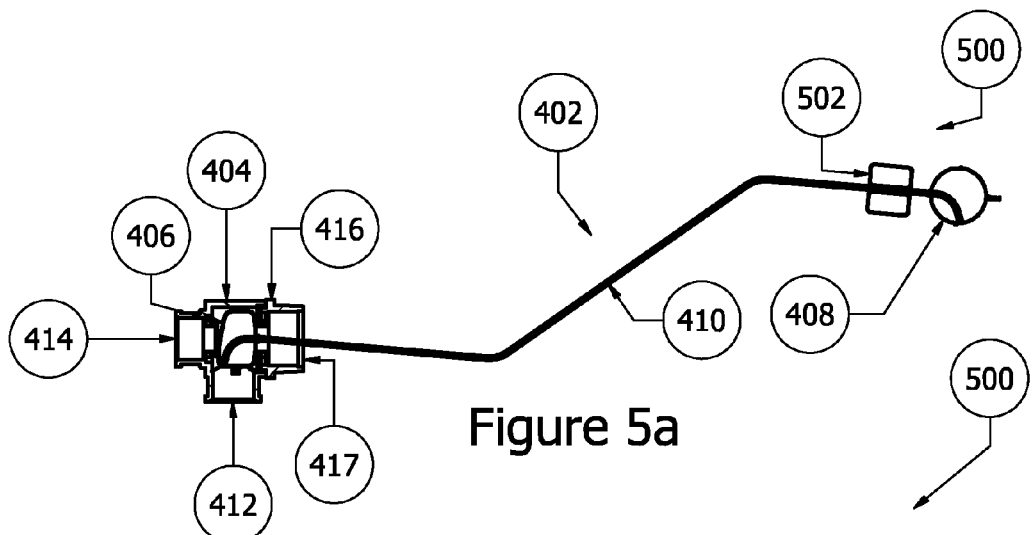
FIGS. 5a to 5c are cross-sectional drawings of a three-way valve incorporating a thermal actuator of an embodiment of the present invention.
Figure 5B:
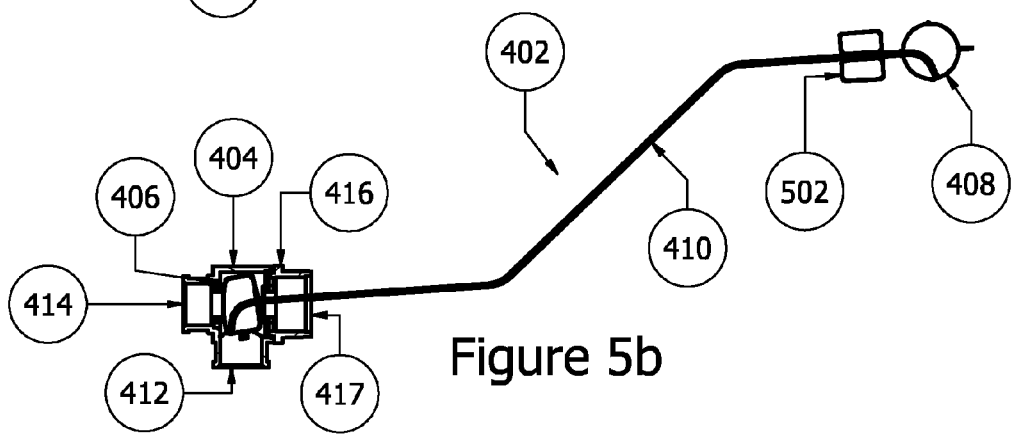
Figure 5C:
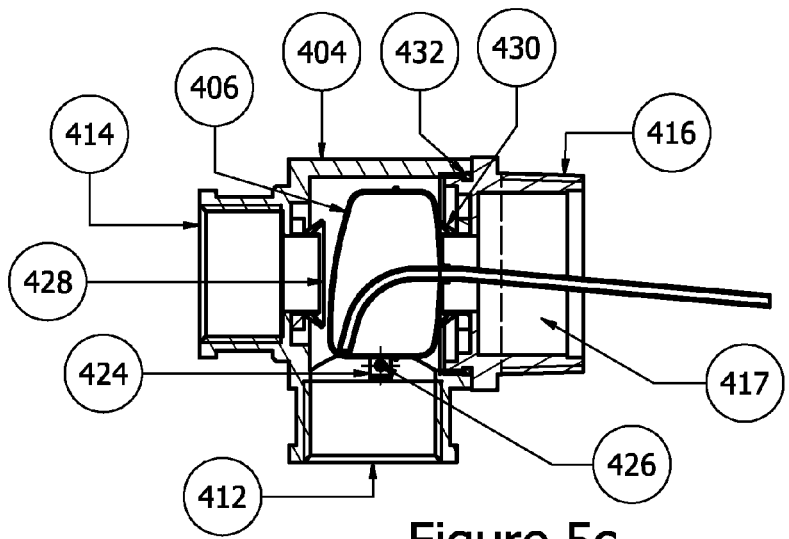

The valve 500 will move to a 'bypass' configuration, as illustrated in FIG. 5*a*, when the second container 408 is experiencing negative buoyancy due to a relatively high amount of the liquid component 114 in the second container 408. Equivalently, the valve 500 will move the 'open' configuration, as illustrated in FIG. 4*b*, when the second container 408 is experiencing positive buoyancy due to a relatively high amount of the gaseous component 116 in the second container 408.

The second container 408 is positioned at a higher level than the first container 406 in both the 'open and 'bypass' configurations, so that the valve 400 can also be in the open position when the fluid flow is slightly higher in temperature than the temperature in the tank at the position of the valve, possibly reducing the average temperature difference between the fluid flow into the tank and the temperature in the tank at the position of the valve.

In this example a buoyancy aid floater 502 attached to the actuator 402, to increase overall buoyancy and increase the upward force exerted by the actuator.

The valve 400 can be installed in a flow that is adding heat to the tank, sometimes described as the 'charge' flow, whereas the inverted action valve 500 can be installed in a flow that is drawing heat from the tank, sometimes described as the 'discharge' flow.

A regulation valve 600 will now be described with reference to FIGS. 6*a* to 6*c*. The regulation valve 600 comprises a thermal actuator 602 coupled to a valve housing 604. The thermal actuator 602 comprises a first container 606, which functions as a temperature sensor of the fluid flow through the valve, and a second container 608, which is arranged within a tank so as to function as both a float body and a temperature sensor of the fluid in the tank, the first and second containers 606, 608 being in fluidal communication with one another via a conduit 610. The conduit 610 is relatively inflexible and, as shown in FIGS. 6*a* and 6*b*, provides a sufficient length between the second container 608 and its coupling to the valve housing 604 such that the conduit 610 can function as a lever arm so as to provide a mechanical advantage when actuating the regulation valve 600.

The second container 608 comprises a filling tube 611 that can be used to at least partially fill the thermal actuator 602 with fluid and that is arranged to be closable after filling. The valve housing 604 comprises an inlet port 612 for receiving fluid flow, a tank outlet port 614 for coupling to the tank (not shown) in which the second container 608 is arranged, and a bypass outlet port 616 for allowing bypass flow therethrough.

Figure 6A:
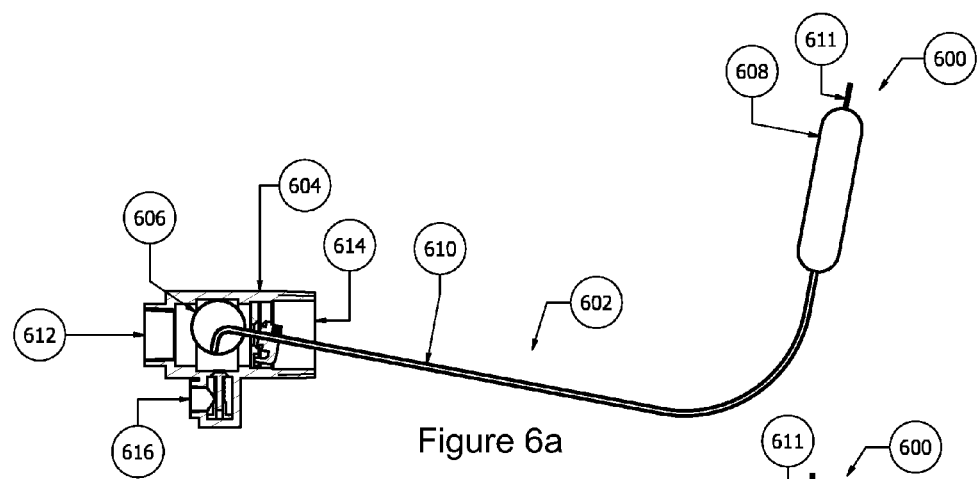
FIGS. 6a to 6c are cross-sectional drawings of a regulation valve incorporating a thermal actuator of an embodiment of the present invention.
Figure 6B:
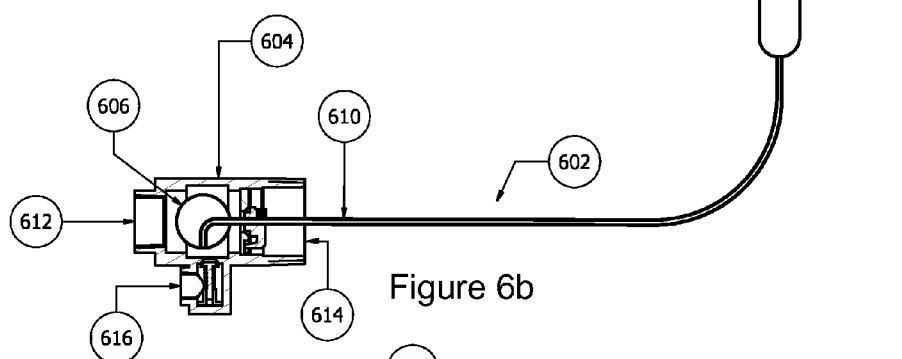
Figure 6C:
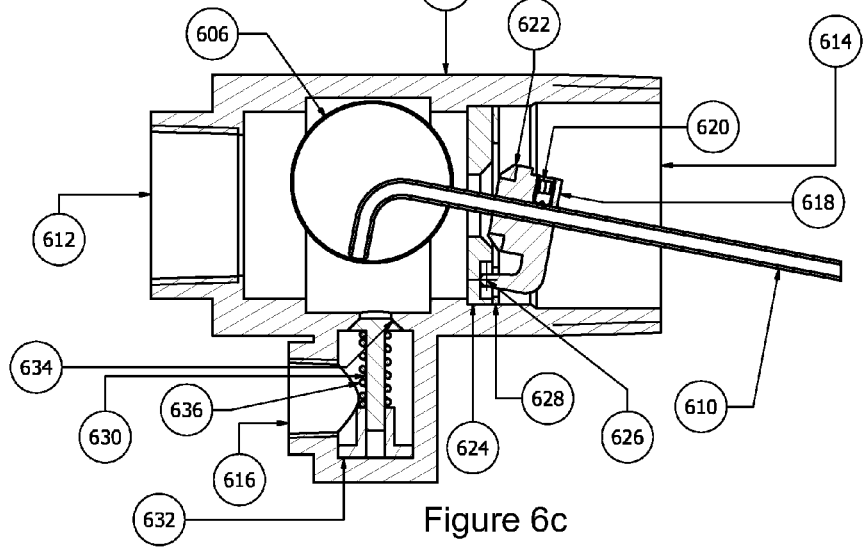

FIG. 6*a* illustrates the valve 600 in an 'open' configuration, wherein fluid flow, coming in through the inlet port 612, is directed to the tank outlet port 614. FIG. 6*b* illustrates the valve 600 in a 'bypass' configuration, wherein fluid flow is directed to the bypass outlet port 616.

The valve housing 604 and its interaction with the thermal actuator 602 will now be described in more detail with reference to FIG. 6*c*.

Inside the valve housing 604, the first container 606 is positioned to function as a temperature sensor of the fluid flow through the valve. The conduit 610 runs through the valve member 618, which is coupled to the conduit 610 via a setting screw 620. A sealing ring 622 is placed over a front of the valve member 618, which closes into a valve seat ring 624. The valve member 618 pivots around a pivot point 626, located in the valve seat ring 624, and the pivot point 626 is covered by a covering ring 628. Fluid flow to the bypass outlet port 616 is controlled by a piston 630, which moves inside a base 632, and is pushed into a valve seat 634 by a spring 636.

In an alternative embodiment of the regulation valve, the flow to the bypass port 616 can be controlled by using a small diameter passage instead of the piston 630, wherein the flow through the passage is a minor portion of the total flow through the valve when the regulation valve is in an 'open' configuration, with the portion of flow through the bypass increasing as the valve moves to a 'closed' configuration.

The thermal actuator 602 is filled with a fluid, such as the fluid 112, such that it is partly filled with the liquid component 114 and partly filled with the gaseous component 116. A volume of the second container 608 is greater than a volume of the first container 606. This allows for a certain volume of the gaseous component 116 and/or the liquid component 114 to be present in the second container 608 regardless of a temperature difference between the first and second containers 606, 608 since a maximum volume of the liquid component 114 that can be transferred between the first and second containers 606, 608 is equal to a volume of the smaller of the first and second containers 606, 608.

The variable extra volume of gaseous component 116 or the liquid component 114 in the second container 608 allows for a variation of a maximum upward and downward force exerted by the second container 608, by varying an amount of the liquid component in the thermal actuator 602. The variation of a maximum upward and downward force can alternatively be achieved by means of a spring attached to the actuator 402, or attached to the pivot arm 420, or by attaching buoyancy aids, such as lightweight material floaters, hollow floaters, foamed floaters etcetera, or sinking weights to the actuator.

In this example, the second container 608 is tube shaped so as to increase a change in level difference between the first and second containers 606, 608 required to move the liquid component 114 between the first and second containers 606, 608, thereby increasing a change in temperature difference required to move the liquid component 114, which increases a regulation range of the valve 600.

In use, fluid flowing through the inlet 612 flows around the first container 606, which as a result will be at, or close to, a temperature of the fluid flow. The second container 608 is arranged inside the tank, and will be at, or close to, a temperature of fluid in the tank at a level in the tank at which the second container 608 is arranged.

The liquid component 114 inside the thermal actuator 602 will flow from the first container 606 to the second container 608, and vice versa, depending on a temperature difference and a level difference between the first and second containers 606, 608 as explained with reference to the thermal actuator of FIG. 2. Starting from the 'open' configuration, when a temperature in the tank is increasing relative to a temperature of the fluid flow, the valve 600 will shut off the flow into the tank as the second container 608 is experiencing increasing positive buoyancy due to an increasing amount of the gaseous component 116 in the second container. When an amount of the gaseous component 116 in the second container 608 reaches a certain level, the fluid flow is closed off to such an extent that a pressure inside the valve housing 604 is sufficient to push open the piston 630 positioned before the bypass outlet port 616, allowing the fluid to flow through the bypass outlet port 616. As an amount of the gaseous component 116 further increases, the valve member 618 will close off all fluid flow into the tank, and all the fluid flow will be directed to the bypass outlet port 616. Equivalently, the valve member 618 will start to open again when an amount of the liquid component 114 in the second container increases due to a rise in temperature of the fluid flow relative to a temperature in the tank.

The regulation valve 600 can control a flow rate of a heated flow into a tank, depending on a temperature of the fluid flow relative to the tank, ultimately reducing the flow to a small bypass flow when the temperature difference becomes too low or negative. This is particularly useful in an application wherein an amount of heat added by a heater depends on a flow rate through the heater, such as in a solar hot water panel, as a reduction in the flow rate means that more heat is added to the fluid flow. Through this, the regulation valve 600 is able to maintain a difference in temperature between the fluid flow and the tank (at a position within the tank at which the second container 608 is arranged) within a certain range by varying the flow rate.

Figure 7A:
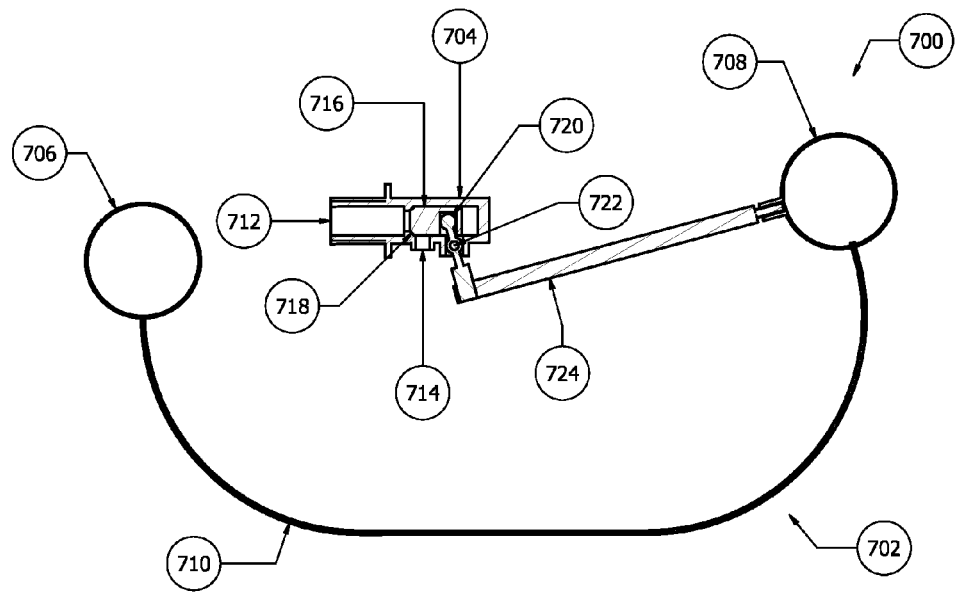
FIGS. 7a and 7b are cross-sectional drawings of two-way valves, based on components of a typical float valve, incorporating a thermal actuator of an embodiment of the present invention.

A two-way valve 700, based on components from a typical float valve, will now be described with reference to FIGS. 7a and 7b. In the example of FIG. 7a, the two-way valve 700 comprises a thermal actuator 702 coupled to a valve assembly 704. The thermal actuator comprises a first container 706, which functions as a temperature sensor, in fluidal communication with a second container 708, which functions as both a float member and a temperature sensor, via a conduit 710.

Figure 7B:
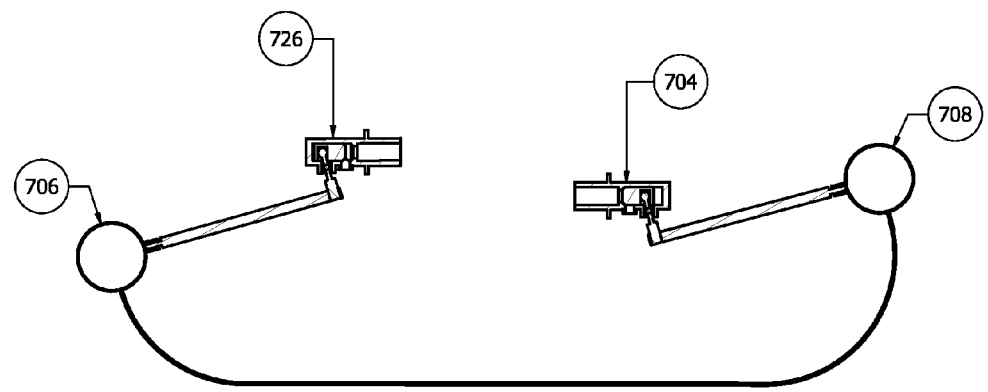

It will be appreciated that the thermal actuator 702 can be used with valve components of many types of level control valves, including piloted level control valves, and is not restricted to use with the valve components referred to in FIGS. 7a and 7b.

FIGS. 7a and 7b illustrate how the concept of the transfer of the liquid component 114 between the first and second containers 706, 708 of the thermal actuator 702 can be applied to function with valve components of a typical level control float valve.

In the example of FIG. 7a, the valve assembly 704 comprises an inlet 712 for receiving fluid flow and an outlet 714 coupled to a tank so as to direct fluid flow to the tank. Inside the valve assembly 704, a piston type valve member 716 closes into valve seat 718. The piston 716 is moved by a pivot arm 720, which pivots about a pivot pin 722. A floater arm 724 couples the pivot arm 720 to the second container 708. In addition to coupling the pivot arm 720 to the second container 708, the floater arm 724 functions as a lever arm and has a length so as to provide a mechanical advantage when actuating the valve.

The first container 706, which functions as a temperature sensor, can be placed in various locations, such as inside a tank, or within a flow line, in which case the first container 706 could be placed inside a further container connected to the flow line.

The thermal actuator 702 is filled with the liquid component 114 and the gaseous component 116. Depending on the temperature difference and the level difference between the first and second containers 706, 708, the liquid component 114 will be present in the first container 706 or in the second container 708, as explained with reference to FIG. 2. For optimal performance, the volume of liquid component 114 should be smaller than the volume of the smallest container of the containers 706, 708.

When the second container 708 contains a relatively large volume of the gaseous component 116, with the liquid component being in the first container, the second container 708 will experience positive buoyancy and close the valve 700, as illustrated in FIG. 7a. When the second container 708 contains a relatively large volume of the liquid component 114, the second container 708 will experience negative buoyancy and open the valve 700.

The two-way valve 700 can be used to determine whether a temperature difference of a fluid, compared to a temperature in a tank with which the valve assembly 704 is coupled, flowing past the first container 706 is of sufficient temperature to enter the tank. The concept can also be applied using multiple valves and one container arranged to function as a sensor, wherein the conduits connecting the containers are all connected, using only enough of the liquid component 114 to open one of the valves, which is where the fluid will flow through.

FIG. 7b illustrates a similar concept, however the first container, which was arranged to function solely as a temperature sensor in the example of FIG. 7a, is now arranged to function as a further float member, as well as a temperature sensor, arranged to actuate a further valve assembly 726. In this example, a temperature difference and a difference in height placement of the valve assemblies 704, 726 between two tanks (or at different levels within the same tank) determines in which of the first or second containers 706, 708 the bulk of the liquid component 114 will be present, which is the valve assembly 726, 704 that will be open.

Although FIG. 7b illustrates two valve assemblies 704, 726, it will be appreciated that the concept can be extended to three or more valve assemblies all connected through one tube system, with only enough of the liquid component 714 to fill one of the valve assembly's associated container. This concept can be used wherein a heated fluid flows to a plurality of tanks, and it is desirable to send the fluid flow to the coldest of the tanks.

It will also be appreciated that the thermal actuator 300 described with reference to FIGS. 3a to 3c could be used in place of the thermal actuator 702. As discussed earlier, one advantage of using the thermal actuator 300 is that different fluids can be used for the liquid-vapor equilibrium in each of the first internal portions 306 of the first and second containers 302, 304 so as to create offsets in the temperature difference point at which the mass transfer occurs by means other than the placement level of the containers 302, 304.

The valves 400, 500, 600 and 700 described above that utilize the thermal actuator of embodiments of the present invention can be used in various applications. Examples of such applications will now be described.

Figure 8A:
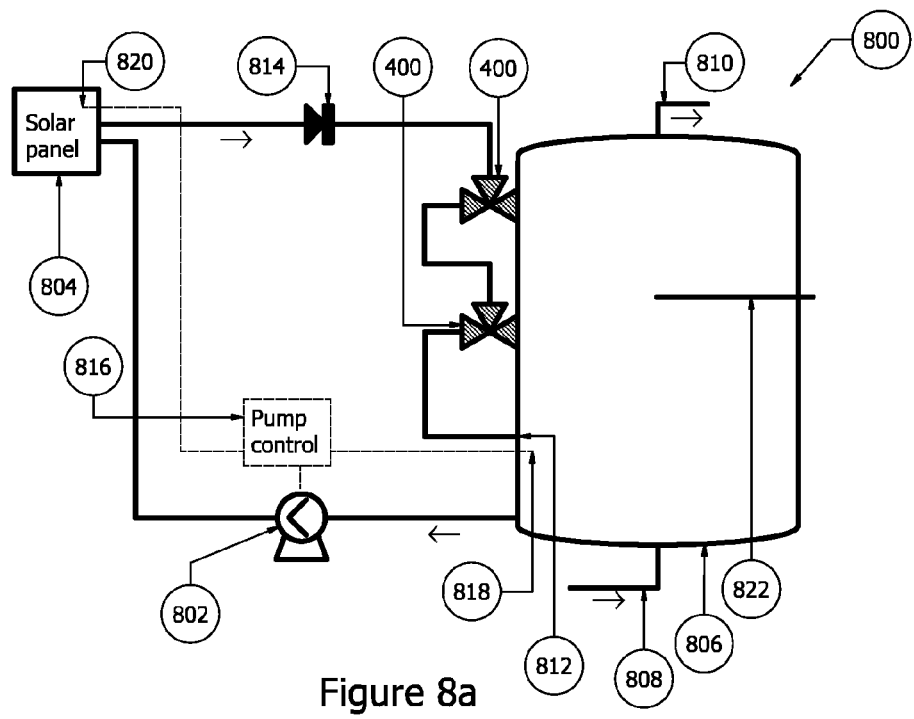
FIGS. 8a and 8b are schematic drawings of solar domestic hot water systems incorporating valves in accordance with embodiments of the present invention.
Figure 8B:
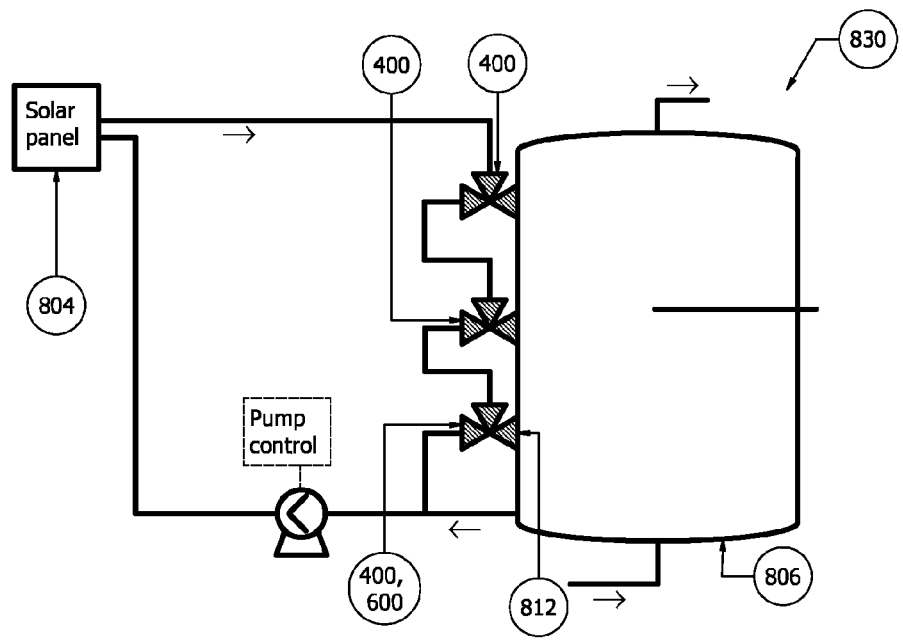

FIGS. 8a and 8b illustrate solar heating systems, of a type that can be used for domestic hot water preparation, that utilize valves of the present invention.

Referring initially to FIG. 8a, there is shown a solar heating system 830, of a type that can be used for domestic hot water preparation, that utilizes the valve 400 described with reference to FIGS. 4a to 4c.

In this example, the hot water system 800 is arranged to directly heat water that is pumped via a pump 802 through a solar collector panel 804 and to store heated water in a storage tank 806. The system 800 comprises three-way valves 400 wherein the pump 802 is controlled using a temperature differential thermostat control, using temperature sensors in the solar collector panel 804 and the storage tank 806.

The storage tank 806 has a cold water inlet 808 and a hot water outlet 810. The water is heated by the solar collector panel 804, and a return flow runs through the valves 400 which are installed on two different levels above a primary tank inlet point 812. A fluid flow loop through the solar collector panel 804 comprises the pump 802 and a check valve 814 arranged so as to prevent an undesirable, thermally driven, reverse flow occurring at nighttime, sometimes described as 'reverse thermosyphon flow'.

The pump 802 is controlled by a control device 816, which is connected to a temperature sensor 818 arranged at a lower region of the storage tank 806, and to a temperature sensor 820 in the solar collector panel 804. The control device 816 controls the pump 802 based on a temperature difference, ensuring that only water that has been sufficiently heated is pumped to the storage tank 806. The tank can be equipped with an auxiliary heating device 822, which heats an upper region of the storage tank 806 to a set temperature, and which may be connected to a timer to operate at nighttime.

In typical solar heating systems used for domestic hot water preparation, there is only one return inlet, usually positioned below the auxiliary heating element, or otherwise typically between 50% and 70% of the tank height. This can result in a big difference in temperature between the return flow and the tank at the position of the return flow, since the temperature of the return flow is highly variable, depending, for example, on a solar intensity and a temperature of the water flow to the panel, and also the temperature in the storage tank at the position of the return inlet is highly variable, for example because typical domestic hot water usage is highly intermittent. A big difference in temperature between the return flow and the tank at the position of the return flow will lead to a high degree of mixing in the tank, and therefore to a low degree of thermal layering, or stratification. The efficiency of a solar domestic hot water system can depend on the degree of thermal layering, or stratification, in the storage tank. Higher stratification in the storage tank is widely accepted to increase the efficiency of solar domestic hot water systems, by keeping the temperature of the flow to the panel relatively low, reducing the amount of thermal loss in the collector panel.

In the system 800 described in FIG. 8a, the storage tank 806 has three possible entry points, two of which are fitted with the three-way valve 400. The return flow from the solar collector panel 804 enters a first uppermost valve 400 of the two three-way valves 400 installed on the storage tank 806, and if a temperature of the water flow is any higher than a temperature of the storage tank 806 at that position, the first valve 400 directs the water flow into the storage tank 806.

If a temperature of the water flow is equal or lower than a temperature at that position in the storage tank 806, the first valve 400 direct the water flow through its 'bypass' outlet, in which case it goes to the second valve 400 of the two valves 400, located at a lower position in the storage tank 806. Again, if a temperature of the water flow is higher than a temperature of the storage tank 806 at that position, the second valve 400 directs the water flow into the storage tank 806. If a temperature of the water flow is equal to or lower than a temperature at that position in the storage tank 806, then the second valve 400 directs the water flow through its 'bypass' outlet.

If the second valve 400 also directs the flow through its bypass outlet, the water flow will enter the storage tank 806 at the primary inlet 812.

The presence of the valves 400 will generally reduce the difference in temperature between the return flow and the storage tank 806 (at the position of the return flow) and thereby reduce the level of mixing, which will lead to increased stratification, and increased efficiency. It will be appreciated that the number of valves 400 used can be varied from one to many, with more valves 400 leading to greater efficiency.

FIG. 8b illustrates a solar heating system 830, which can be used for domestic hot water preparation, wherein a third valve 400 is also installed on the primary inlet 812. In this case, if the bottom third valve 400 on the primary inlet 812 is in its 'bypass' position, the storage tank 806 is completely bypassed. The third valve 400 ensures that only water that has been sufficiently heated can enter the storage tank 806, and it can therefore replace the function of the temperature differential thermostat control device 816 of FIG. 8a. The control of the pump 802 can instead be provided by an optical sensor or a timer device, which represents a significant cost reduction compared to a thermostat controller with temperature sensors, or the pump 802 can be driven by power from a small solar photovoltaic panel, which acts a power source and optical sensor, so no control device is required at all.

The bottom third valve can be the valve 400 or the regulation valve 600 described with reference to FIGS. 6a to 6c. Using the regulation valve 600 can provide an advantage as the regulation valve 600 can regulate a flow rate based on a temperature of the return flow, thereby slowing the flow rate at times of low solar intensity, which will lead to a larger increase in temperature at the solar collector panel 804. This is particularly advantageous when the pump control is on/off, i.e. using an optical switch or timer.

Another advantage of using valves 400, 600 on all the entry points to the storage tank 806, as illustrated in FIG. 8b, is that there is potentially no need for a check valve, since a cold reverse thermosyphon flow at night is not able to enter the storage tank 806, since all the valves 400, 600 will be in 'bypass' position, closing off entry to the storage tank 806. This reduces the cost of a check valve, and also eliminates a pressure drop caused by the check valve.

Using the valves 400, 600 to prevent the reverse thermosyphon flow from entering the storage tank 806 also has an application for solar domestic hot water systems based on thermosyphon flow, sometimes described as passive solar domestic hot water systems. Thermosyphon based solar domestic hot water systems cannot use the check valves commonly used in the pumped systems, since the pressure drop caused by these check valves is too large. To restrict any reverse thermosyphon flow at night, these systems are commonly designed such that a lower region of the tank is positioned higher than a top of the solar panel. In practice, most thermosyphon systems therefore use a horizontally placed tank, which greatly reduces the stratification in the tank due to the low height of the tank. When using the valves 400, 600 on all entry points the threat of reverse thermosyphon flow is eliminated, so a vertical tank can be used for thermosyphon systems, positioned at the same level as the panel.

The systems 800, 830 described in FIGS. 8a and 8b can also be used for solar domestic hot water systems wherein the water is not directly heated in the solar collector panel, e.g. because of frost protection issues, also referred to as 'indirect' or 'closed loop' systems. In this case, an external heat exchanger, e.g. a 'side-arm' heat exchanger, can be used, wherein the main pump circulates water between the collector panel and the heat exchanger. Water from a lower region of the storage tank is circulated through the heat exchanger, and then to the top valve, where the flow can be driven by natural convection (thermosyphon flow), or by a secondary pump.

Figure 9:
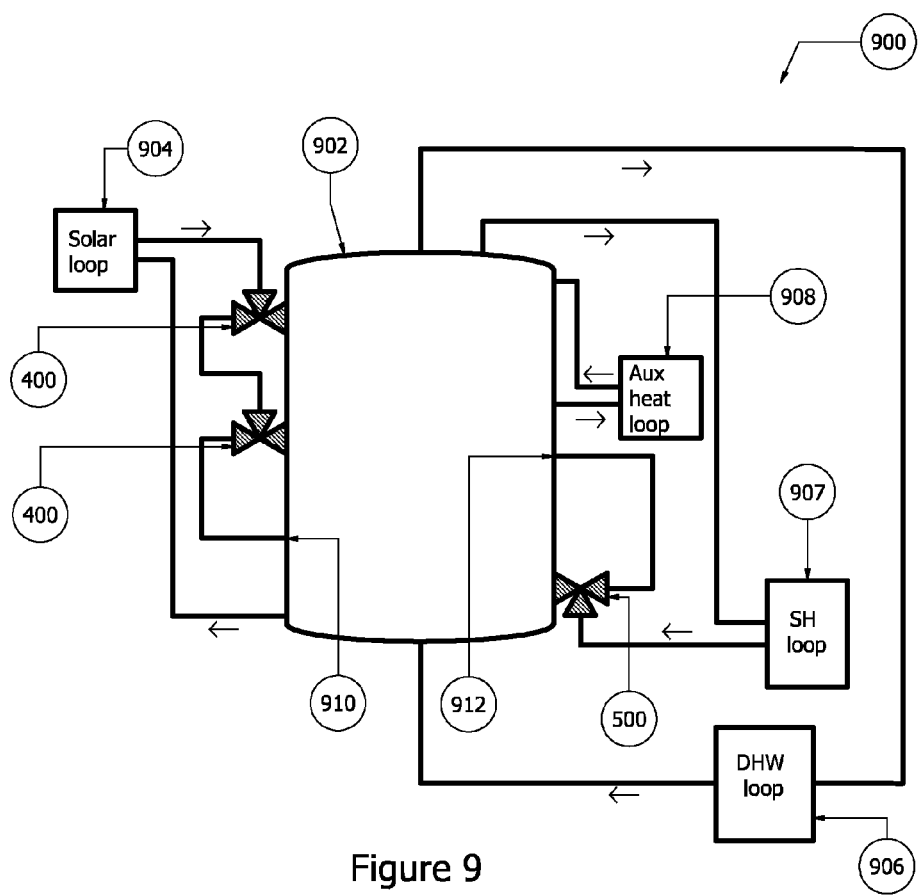
FIG. 9 is a schematic drawing of a solar thermal system incorporating valves in accordance with embodiments of the present invention.

FIG. 9 illustrates a heating system 900, wherein collected heat can be used for multiple applications, e.g. domestic hot water (DHW) and space heating (SH). A storage tank 902 is connected to a charging loop 904, such as solar panels, which provides heat to the storage tank 902. The storage tank 902 is also connected to a primary discharge loop 906, which draws heat from the storage tank 902 for a first application, such as domestic hot water preparation. The storage tank 902 is also connected to a secondary discharge loop 907, which draws heat for a second application, such as space heating, which can have a different return flow temperature than the primary discharge loop, for example it can have a higher return flow temperature. The storage tank is also connected to an auxiliary heating loop 908, which also provides heat to the storage tank 902. Loops 904, 906, 907 and 908 can all be fitted with heat exchangers, so a different fluid can be used to the one used in the storage tank. For example, when primary discharge loop 906 is used for domestic hot water preparation, a heat exchanger will typically be used.

The storage tank 902 is fitted with two three-way valves 400, of the type described with reference to FIGS. 4a to 4c, which are installed at two return flow entry points of the charging loop 904. The charging loop 904 also has a third, primary, entry point 910, which is not fitted with a valve. The storage tank 902 is also fitted with an inverted action three-way valve 500, of the type described with reference to FIGS. 5a to 5c, which is installed on one of the return flow entry points of the secondary discharge loop 907. The return flow of the secondary discharge loop 907 also has a second, primary, entry point 912, which is not fitted with a valve.

In the system 900, the storage tank 902 has three possible entry points for the return flow from the charging loop 904, two of which are fitted with the three-way valve 400. The return flow from the charging loop 904 enters an uppermost first valve 400 of the two three-way valves 400 installed on the storage tank 902, and if the temperature of the flow is higher than the temperature of the tank 902 at that position, the first valve 400 directs the flow into the tank 902.

If the temperature of the flow is equal to or lower than the temperature at that position in the tank 902, the first valve 400 directs the flow through its 'bypass' outlet, in which case it goes to the second valve 400 located at a lower position in the tank 902.

Again, if the temperature of the flow is higher than the temperature of the tank 902 at that position, the second valve 400 directs the flow into the tank 902. If the temperature of the flow is equal to or lower than the temperature at that position in the tank 902, the second valve 400 direct the flow through its 'bypass' outlet. If the second valve 400 also directs the flow through its bypass outlet, the flow will enter the tank 902 at the primary inlet 910.

The storage tank 902 also has two possible entry points for the return flow of the secondary discharge loop 907, one of which is fitted with the three-way inverted action valve 500. The return flow from the secondary discharge loop 906 enters the inverted action three-way valve 500 and if the temperature of the flow is lower than the temperature of the tank 902 at that position, the valve 500 directs the flow into the tank 902. If the temperature of the flow is equal or higher than the temperature at that position in the tank 902, the valve 500 direct the flow through its 'bypass' outlet. In this case, the flow will enter the tank at the primary inlet 912.

In heating system 900 various types of heat sources can be used in charging loop 904, since using the valve 400 in the return flow of the charging loop 904 will have a benefit for all types of heat sources that have a variable return flow temperature. Besides solar thermal, these can include biomass burners, waste heat and heat pumps.

Also, various types of heating applications can be used in the primary discharge loop 906 and secondary discharge loop 907, since using the valve 500 in the return flow of the secondary discharge loop 907 will have a benefit for any combination of discharge loops where there is a difference in return flow temperature between the primary and secondary discharge loops.

Furthermore, multiple charging loops 904 can be used in heating system 900, and multiple secondary discharging loops 907 can be used in heating system 900.

It should also be noted that a heating system such as heating system 900 will benefit from a charging loop such as charging loop 904 also when no secondary discharging loop such as secondary discharging loop 907 is present.

It should furthermore be noted that a heating system such as heating system 900 will benefit from a secondary discharging loop such as secondary discharging loop 907 also when no charging loop such as charging loop 904 is present.

There a various systems that can be used to increase stratification in large scale thermal solar systems, most of which involve internal devices inside the tank, such as ducts, known as stratification devices. The use of such stratification devices inside the tank has disadvantages due to heat conduction and undesirable flow effects, which can severely limit the efficiency gain that can be achieved. The use of electronically controlled multiport valves, e.g. three-way valves, to direct the flow to different entry points is another example of a system that is currently used to increase stratification in storage tanks. These electrically operated valves are electronically controlled based on temperature measurements in the flow and in the tank, usually at different positions in the tank for optimum performance (i.e., positioned in the tank at the level of the different entry points).

In contrast, the system 900 uses 'passive' valves and presents a potentially significant cost saving over a system using electrically controlled valves, saving the cost of the added temperature sensors, saving the cost of a relatively sophisticated control device and saving costs due to electricity consumption. For the charging loop 904, a valve such as the valve 400 or valve 600 can also be installed on the primary inlet 910 (as described with reference to the system 830 of FIG. 8b), so no temperature differential thermostat control is required (or any temperature sensors) for the solar loop 904, representing additional potential cost savings. For the secondary discharging loop 906 a valve such as the inverted action three-way valve 500 can also be installed on the primary inlet 912, so that the tank can be completely bypassed if the return flow of the loop is hotter than the temperature in the tank at all the entry point. This can be particularly useful if the auxiliary heat is not provided in the tank 902, but in a separate tank or by an inline heating device.

Having described various embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A thermal actuator comprising:
   at least two containers containing a first fluid, the at least two containers defining interior portions that are interconnected such that the interior portions of the containers are in fluidal communication with each other, the first fluid comprising a first liquid component and a second gaseous component,
   wherein:
   the thermal actuator is arranged such that a change in a temperature difference between two of the at least two containers that is within a predetermined range of temperature difference causes a quantity of a fluid contained in the thermal actuator to be transferred from one to another of the at least two containers such that a mass distribution of the fluid contained in the thermal actuator is altered in response to the change in temperature difference; and
   the alteration of the mass distribution of the fluid causes actuation due to a chance in buoyancy of one of the at least two containers so as to result in a relative movement between the at least two containers.

2. The thermal actuator of claim 1, wherein the at least two containers are interconnected such that a closed system is formed.

3. The thermal actuator of claim 1, wherein the second gaseous component comprises a vapor of the first liquid component that is at least one of in or close to liquid-vapor equilibrium with the first liquid component at a liquid-vapor interface or interfaces.

4. The thermal actuator of claim 1, wherein the fluid that is transferred between containers in response to the change in temperature difference is at least a portion of the first fluid.

5. The thermal actuator of claim 1, wherein the fluid that is transferred between containers in response to the change in temperature difference is at least a portion of a further fluid.

6. The thermal actuator of claim 5, wherein the first and the further fluids are substantially separated from one another.

7. The thermal actuator of claim 6, wherein the thermal actuator is arranged to separate the first and further fluids by a physical barrier.

8. The thermal actuator of claim 6, wherein the first and further fluids are substantially separated by virtue of respective properties of the fluids.

9. The thermal actuator claim 1, wherein respective lower regions of the interior portions of the at least two containers are interconnected so as to promote a flow of a liquid component of the fluid therebetween.

10. A thermal actuator comprising first and second portions, the thermal actuator being actuatable in response to a change in a temperature difference between the first and second portions in a manner such that an actuating force is provided by mass transfer between the first and second portions of the thermal actuator in response to the change in a temperature difference between the first and second portions, wherein the actuating force is a result of relative movement between the first and second portions due to a change in buoyancy of one of the first and second portions.

11. A valve comprising a thermal actuator, the valve being arranged so as to be actuated by the thermal actuator, the thermal actuator comprising:
    at least two containers containing a first fluid, the at least two containers defining interior portions that are interconnected such that the interior portions of the containers are in fluidal communication with each other, the first fluid comprising a first liquid component and a second gaseous component,
    wherein:
    the thermal actuator is arranged such that a change in a temperature difference between two of the at least two containers that is within a predetermined range of temperature difference causes a quantity of a fluid contained in the thermal actuator to be transferred from one to another of the at least two containers such that a mass distribution of the fluid contained in the thermal actuator is altered in response to the change in temperature difference; and the alteration of the mass distribution of the fluid causes actuation of the valve due to a change in weight of one of the at least two containers so as to result in a relative movement between the at least two containers.

12. The valve of claim 11, wherein the valve comprises a valve housing to which the thermal actuator is coupled, the valve housing comprising an inlet port, an outlet port and a valve member for closing the outlet port, the valve being arranged such that a first container of at least two containers of the thermal actuator is associated with a temperature of an inlet fluid and a second of the at least two containers is associated with a temperature of fluid in a vessel into which fluid from the outlet port can flow; and wherein the valve is arranged such that the thermal actuator causes the outlet port to be closed or opened by the valve member based on a temperature difference between the first and second containers.

13. The valve of claim 12, wherein the thermal actuator actuates the valve member.

14. The valve of claim 12, wherein the thermal actuator is coupled to the valve member for actuation thereof via a lever arm member, the lever arm member having a length so as to provide a mechanical advantage when actuating the valve.

15. The valve of claim 12, wherein the valve housing comprises a bypass port.

16. The valve of claim 12, wherein the first container comprises the valve member.

17. The valve of claim 12, wherein first and second containers are coupled by a conduit that is relatively inflexible and has a length such that the conduit can function as a lever arm so as to provide a mechanical advantage when actuating the valve.

18. A heating system comprising:
a container for containing a heating medium, the container comprising at least one inlet arranged to receive the heating medium, and at least one outlet;
a heat transferrer for transferring heat obtainable from an energy source to the heating medium, the heat transferrer having an inlet for receiving the heating medium, a heat transfer portion for transferring heat obtained from the energy source to the received heating medium, and an outlet for the heated heating medium to exit therethrough; and
a heating medium transfer network for transferring the heating medium between the container and the heat transferrer, the transfer network being arranged so as to allow the heating medium to be transferred from the outlet of the container to the inlet of the heat transferrer, and from the outlet of the heat transferrer to the at least one inlet of the container, the transfer network being connected to the at least one inlet of the container; and
wherein the at least one inlet of the container comprises a valve in accordance with claim 11, the valve being arranged so as to allow the heating medium to enter the container if a temperature difference between heating medium in the transfer network in the vicinity of the valve and heating medium in the container in the vicinity of the valve is greater than a predetermined threshold.

19. The heating system of claim 18, wherein the container comprises a plurality of inlets arranged at different heights of the container and arranged to receive the heating medium, the heating medium transfer network being connected to the inlets of the container in series from an uppermost inlet to a lowermost inlet; and wherein at least an uppermost inlet of the container comprises a valve in accordance with claim 11, the valve being arranged so as to allow the heating medium to enter the container if a temperature difference between heating medium in the transfer network in the vicinity of the valve and heating medium in the container in the vicinity of the valve is greater than a predetermined threshold.

20. The heating system of claim 18, wherein the heat transferrer is arranged to obtain heat from a solar energy source.

* * * * *

UNITED STATES PATENT AND TRADEMARK OFFICE
CERTIFICATE OF CORRECTION

| | |
|---|---|
| PATENT NO. | : 9,309,870 B2 |
| APPLICATION NO. | : 13/622133 |
| DATED | : April 12, 2016 |
| INVENTOR(S) | : van Ruth |

It is certified that error appears in the above-identified patent and that said Letters Patent is hereby corrected as shown below:

In the claims,

<u>Column 22</u>

Line 15, "chance" should read --change--

Signed and Sealed this
Twelfth Day of July, 2016

Michelle K. Lee
*Director of the United States Patent and Trademark Office*